Figure 2B:
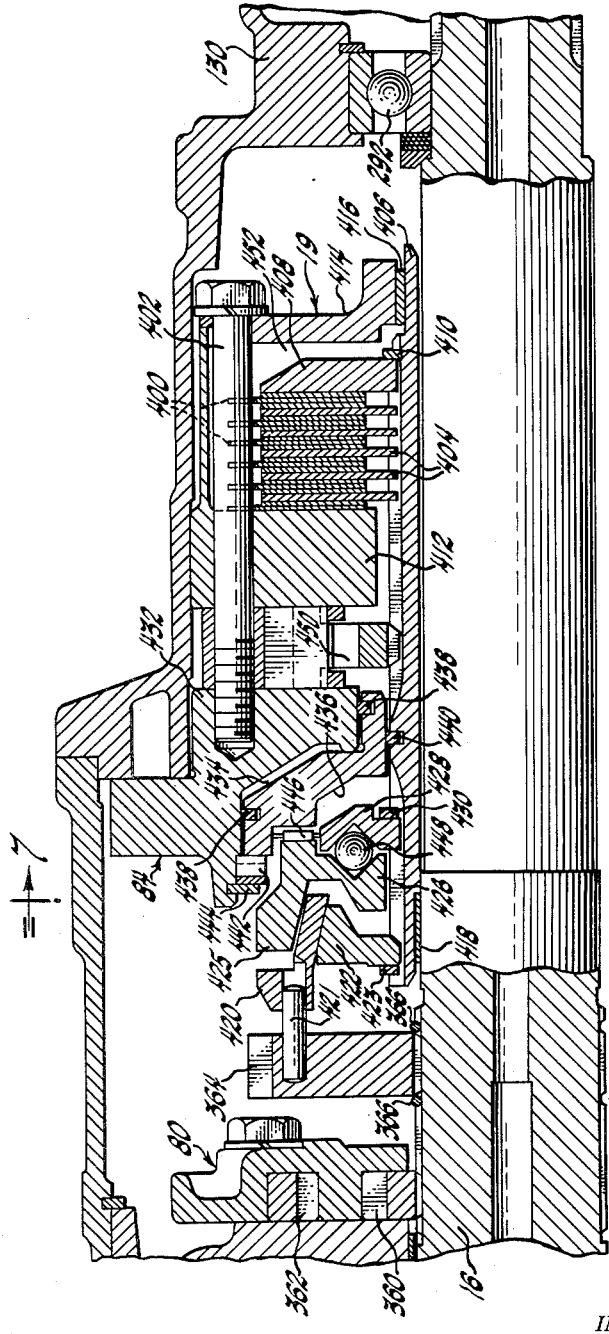

Feb. 6, 1962 O. K. KELLEY 3,019,670
TRANSMISSION
Filed July 17, 1956 9 Sheets-Sheet 1
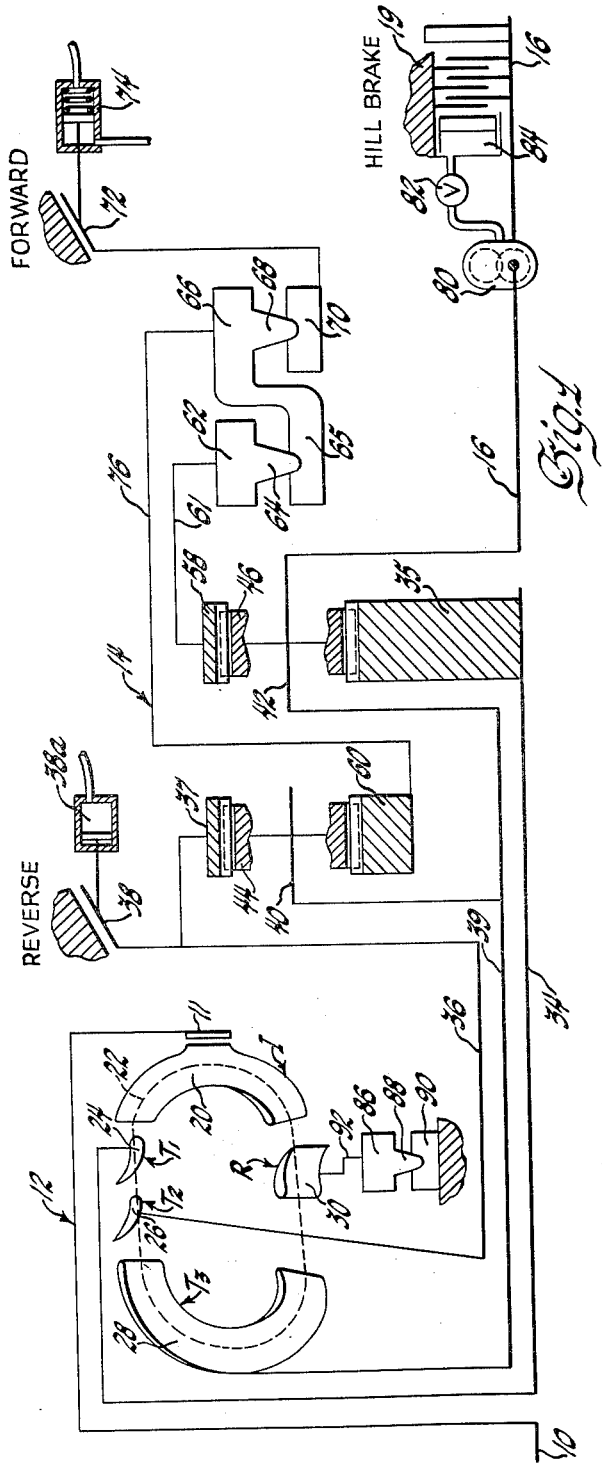
INVENTOR.
Oliver K. Kelley
BY
T. L. Chisholm
ATTORNEY

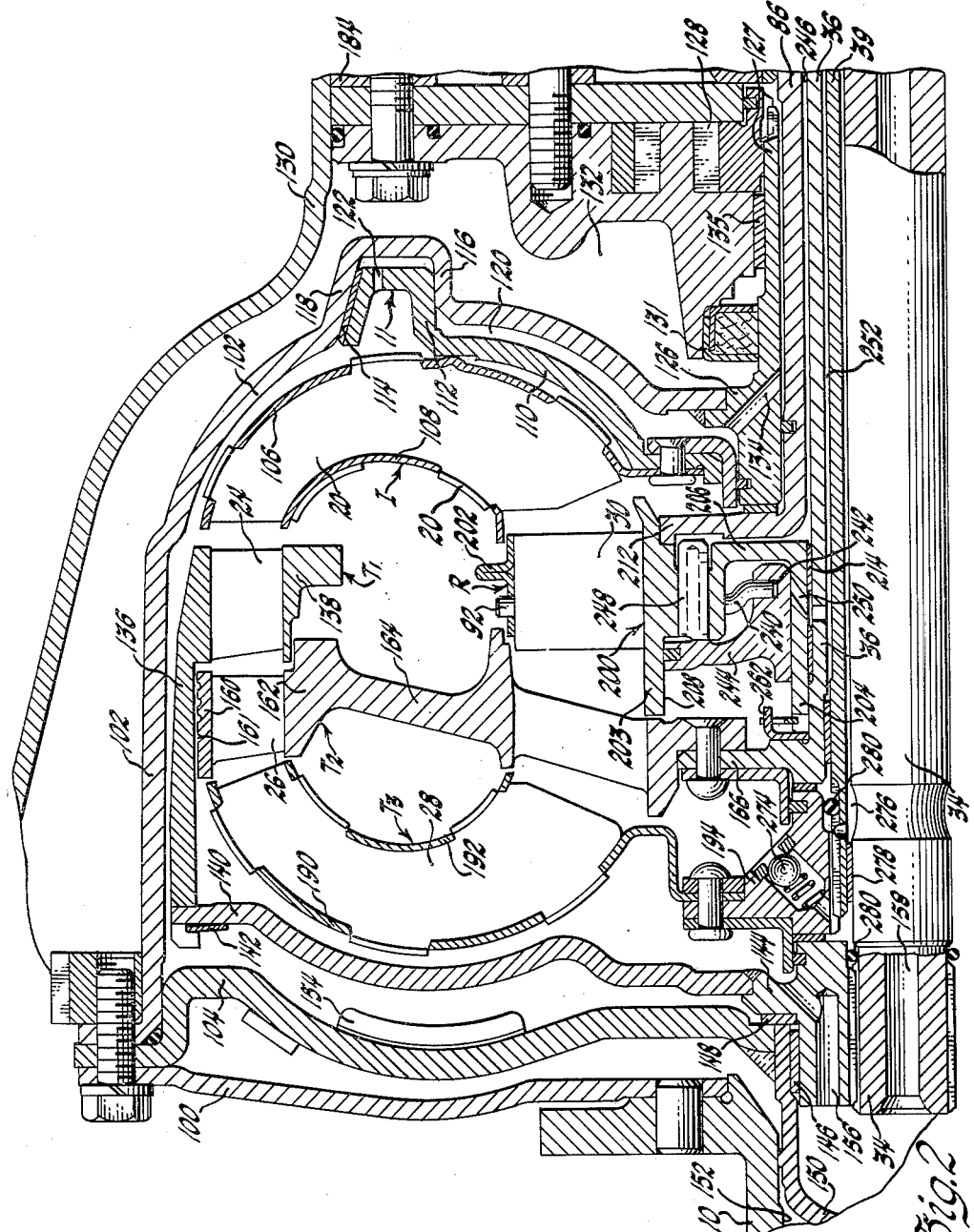

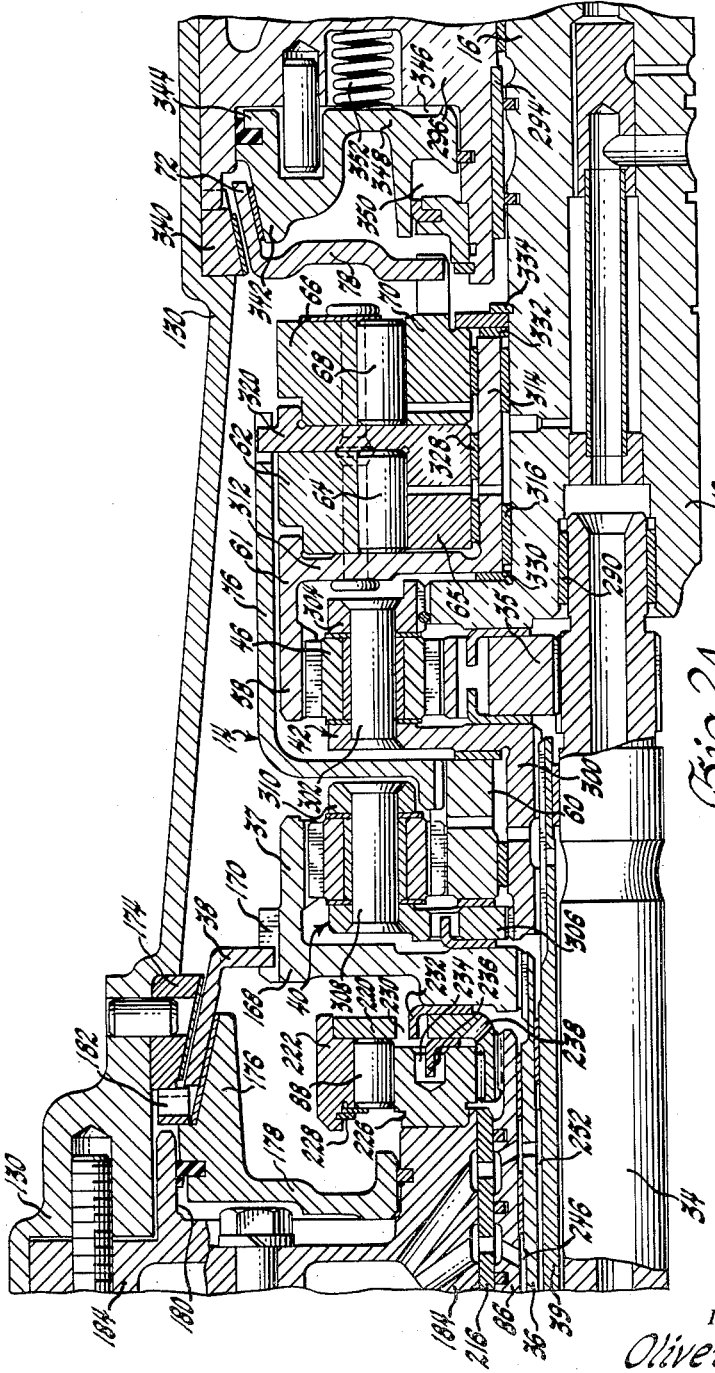

Feb. 6, 1962     O. K. KELLEY     3,019,670
TRANSMISSION

Filed July 17, 1956     9 Sheets-Sheet 4

INVENTOR.
Oliver K. Kelley
BY
T. L. Chisholm
ATTORNEY

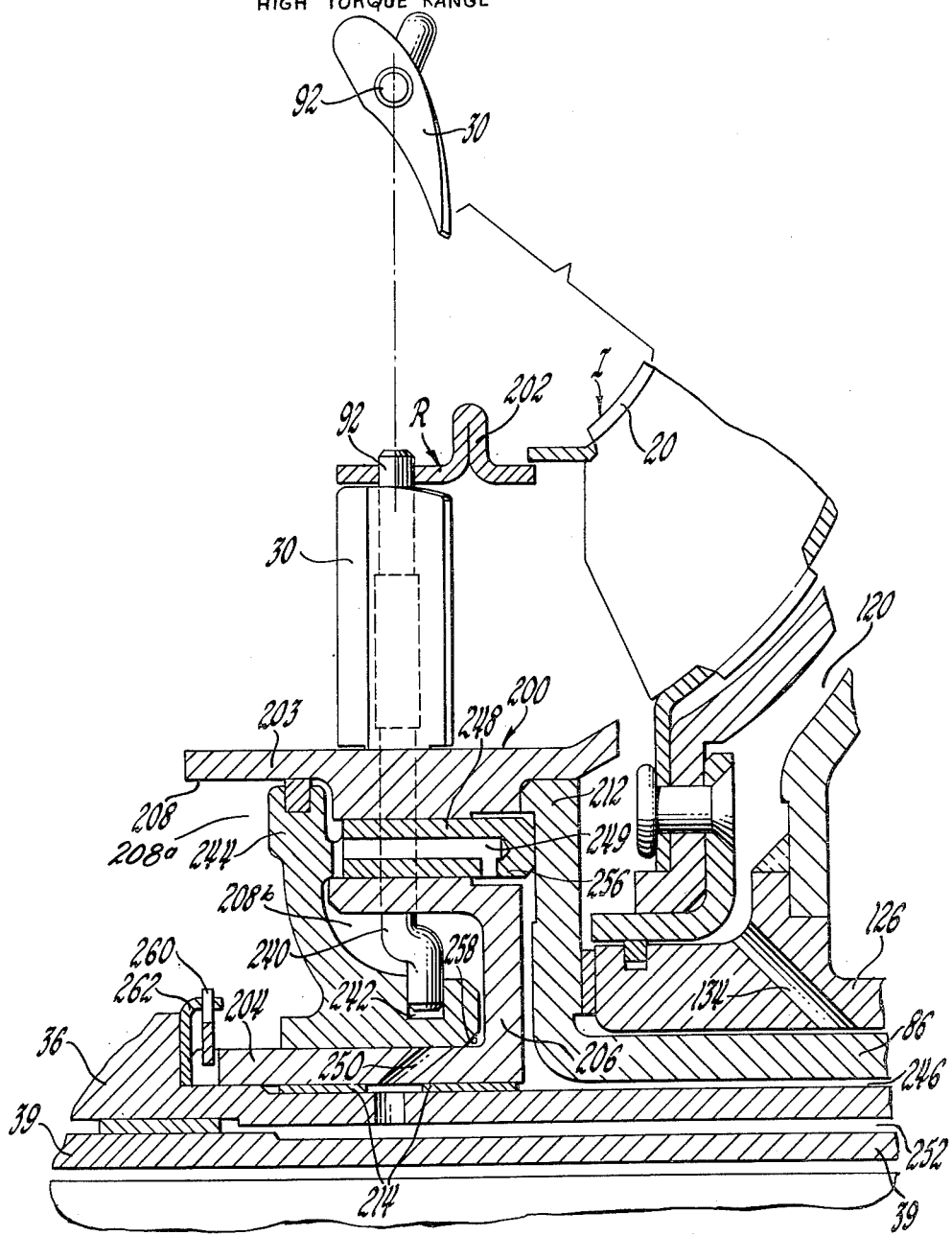

Feb. 6, 1962     O. K. KELLEY     3,019,670
TRANSMISSION
Filed July 17, 1956     9 Sheets-Sheet 6
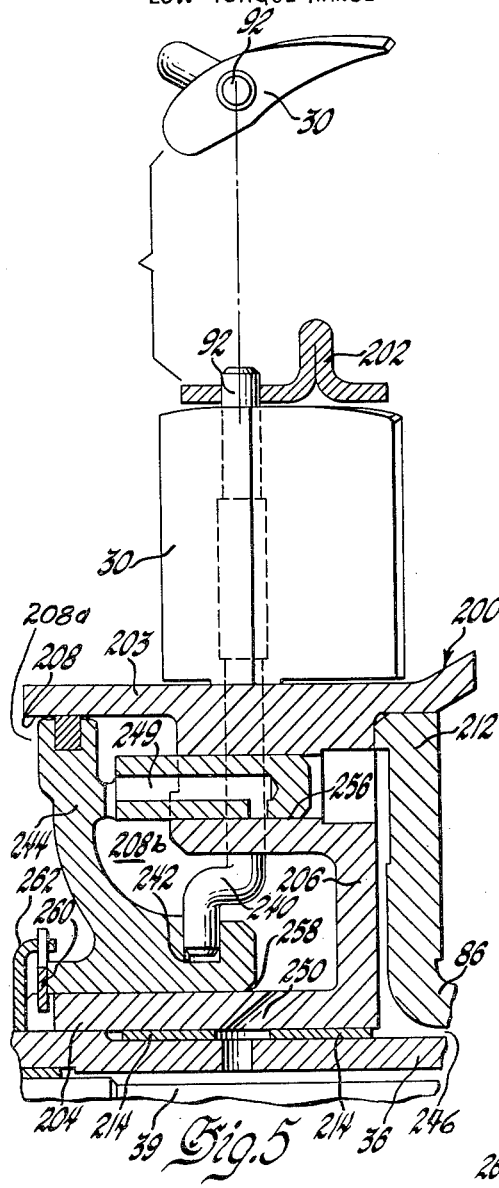
Fig. 5 — LOW TORQUE RANGE
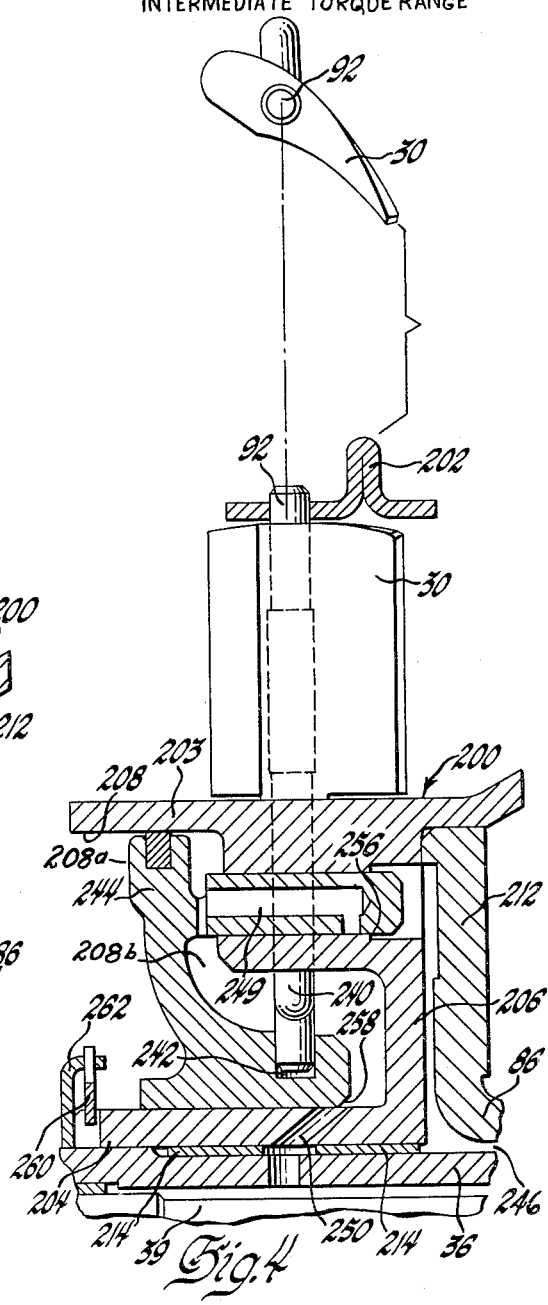
Fig. 4 — INTERMEDIATE TORQUE RANGE
INVENTOR.
Oliver K. Kelley
BY
T. L. Chisholm
ATTORNEY

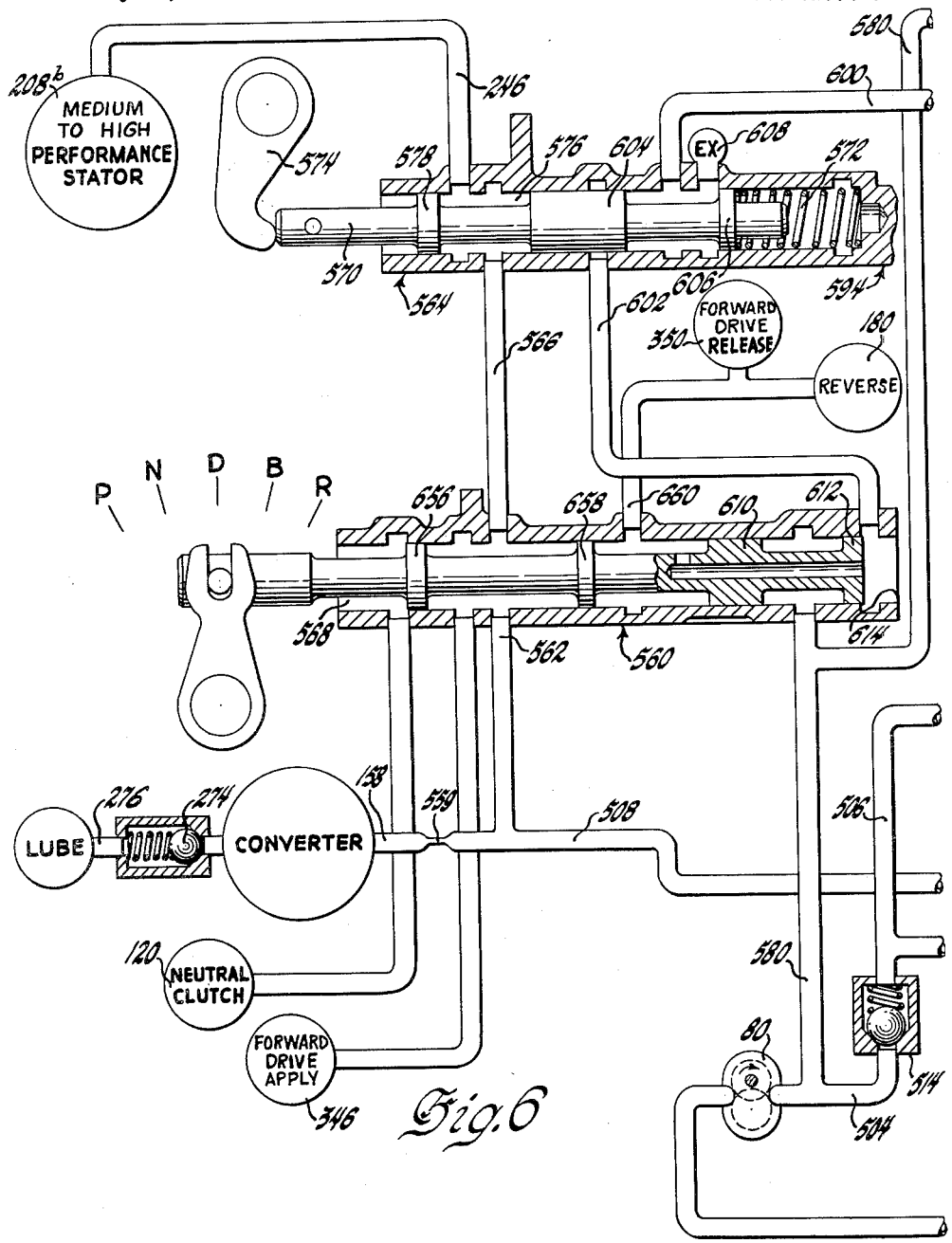

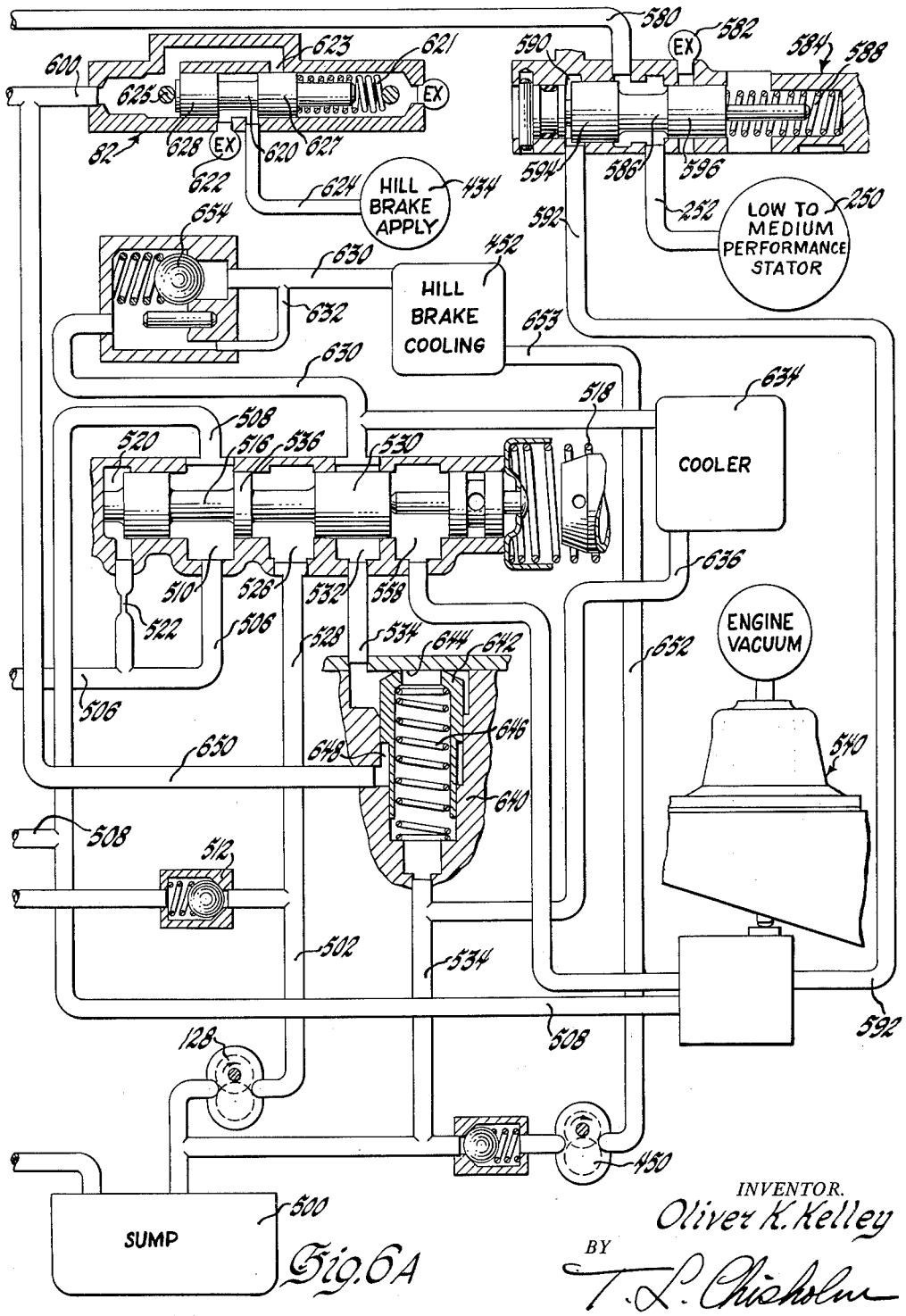

Feb. 6, 1962     O. K. KELLEY     3,019,670
TRANSMISSION
Filed July 17, 1956     9 Sheets-Sheet 9
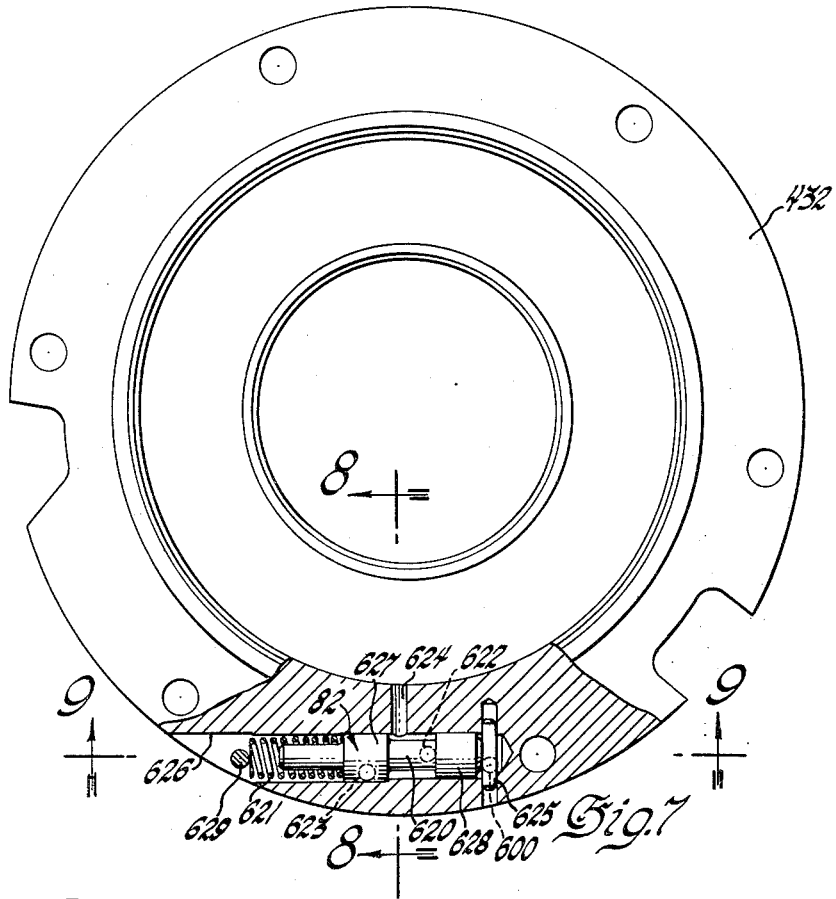
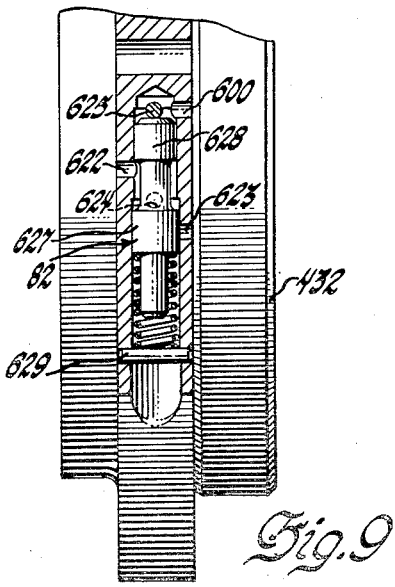
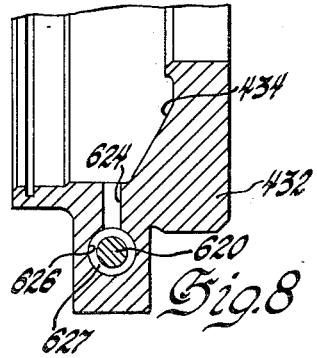
INVENTOR.
Oliver K. Kelley
BY
T. L. Chisholm
ATTORNEY

United States Patent Office 3,019,670
Patented Feb. 6, 1962

3,019,670
TRANSMISSION
Oliver K. Kelley, Bloomfield Hills, Mich., assignor to General Motors Corporation, Detroit, Mich., a corporation of Delaware
Filed July 17, 1956, Ser. No. 598,370
8 Claims. (Cl. 74—677)

This invention relates to improvements in hydrodynamic torque transfer and/or multiplying devices and associated gearing for driving a power output member at various speed ratios from a power input member. These are particularly, although not exclusively, suited to motor vehicle transmissions, and such a transmission is described herein as one example of a device to which my invention may be applied. Also, the invention is especially adapted to hydrodynamic torque converters or speed reducers which multiply torque, but some features of the invention are applicable to hydrodynamic torque transmitting devices generally.

The objects of this invention include the improvement of the mechanical structure and arrangement of the component parts of transmissions of the type disclosed in my application S.N. 537,472, filed September 29, 1955, the disclosure of which is incorporated herein by reference, and improvements in control systems for such transmissions.

FIGURE 1 shows schematically a transmission embodying one form of my invention, being one half of a longitudinal section which is symmetrical about the axis of rotation, FIGURES 2, 2A and 2B collectively form one-half of a symmetrical longitudinal section of the actual structure of a transmission embodying one form of my invention, FIG. 2 being a section of a torque converter including its neutral clutch, FIG. 2A being a section of planetary gearing and FIG. 2B being a section of a retarder or transmission brake, FIG. 3 is an enlarged section taken as FIG. 1 is taken of stator control piston in the position of high torque converter performance, the corresponding high angle position of a blade being indicated schematically at the top of the figure, FIG. 4 is a section like FIG. 3 showing the stator control in mid position to hold the stator blades at medium angle, FIG. 5 is a section like FIG. 3 showing the stator control in low angle position, FIGS. 6 and 6A together constitute a diagram of a hydraulic control system for a transmission shown in the preceding figures, FIG. 7 is an elevation, partly in section of a hill brake control cylinder removed from the assembly, and viewed in general from the line 7—7 of FIG. 2B, FIG. 8 is a section on the line 8—8 of FIG. 7, and FIG. 9 is a section on the line 9—9 of FIG. 7 showing a control valve for operating the cylinder of FIGS. 7 and 8.

General arrangement

Referring to FIG. 1, the transmission includes in general an input or engine shaft 10 which can be connected by any suitable torque-establishing device 11 to a hydrodynamic torque converter 12 which in turn drives planetary reduction gearing 14 connected to a final drive shaft 16. The final drive shaft may have a retarder or hill brake 19. Novel features are included in the construction and arrangement of the torque converter; in the construction and arrangement of the reduction gearing separately and in combination with the torque converter; in the construction and control of the brake; and in control system generally.

The torque converter includes a pump or impeller I of generally known form, represented diagrammatically in FIG. 1 by a single blade 20, rotated by the input shaft 10 when connected thereto by the torque-establishing device 11 and circulating working liquid in a closed toroidal path, the center line of which is represented by the dotted line 22 in FIG. 1.

A first turbine $T_1$ is represented in FIG. 1 by a single blade 24, a second turbine $T_2$ is represented by blade 26, a third turbine $T_3$ by blade 28 and a reaction member R by blade 30. The liquid from the pump I flows successively through $T_1$, $T_2$, $T_3$ and R, as is known.

The first turbine $T_1$ is connected by shaft 34 to drive a rear input sun gear 35 of the planetary gearing. The second turbine $T_2$ is connected by a shaft 36 to drive a front input ring gear 37 which can also be held fast by any suitable torque-establishing device such as a friction cone 38 which can be set by any suitable hydraulic cylinder 38a to effect reverse drive, as will be explained.

The torque-establishing device 11 is of that type which is sometimes referred to as a clutch. The torque-establishing device 38 is of the type which is sometimes referred to as a reaction brake. Since it is immaterial for the purposes of this invention whether the device 38 is technically a clutch or a brake, I use the broad term torque-establishing device to refer both to clutches and to brakes. Where friction clutches or friction brakes are concerned I use the more specific but nevertheless generic term friction torque-establishing device. I use these terms to designate any releasable device which establishes torque between two members which at times are rotatable relative to each other, and this includes both clutches and brakes.

The third turbine $T_3$ is connected by shaft 39 to drive front and rear carriers 40 and 42, which respectively support front planetary pinions 44 meshing with the front input ring gear 37, and rear planetary pinions 46 which mesh with the rear input sun gear 35. The shaft 39 forms the principal drive shaft of the transmission and through the carrier 42 is connected to the final drive shaft 16. A reaction ring gear 58, meshing with planet pinions 46 completes the rear planetary unit of the reduction gear, and a reaction sun gear 60, meshing with the front planet pinions 44, completes the front planetary unit.

The rear reaction ring gear 58 is connected by a drum 61 to a one-way torque-establishing device or ratchet schematically represented by the upper half of an outer race 62 which can rotate about the centerline of shaft 16 and toward the eye of the observer, with respect to a race 65, but is prevented from rotating in the opposite sense with respect to the race 65 by a blade 64 secured to the outer race 62 and overlapping race 65. The inner race 65 is integral with an outer race 66 of a second similar one-way torque-establishing device rotatable toward the eye of the observer about an inner race 70 but prevented from rotating in the opposite sense with respect to race 70 by ratchet blade 68. The race 70 can be held fast by any suitable torque-establishing device, such as a cone 72 which can be set by a hydraulic cylinder 74. The races 66 and 65 are connected to the front sun reaction gear 60 by a drum 76. When the forward cone 72 is released, and the reverse cone 38 is set, the ring gear 58 drives the sun gear 60 backward through the free wheeler 62—64—65.

The drive shaft 16 is constantly connected to drive a so-called rear pump 80 which when running forward above a predetermined speed can pump oil under pressure through any suitable control valve 82 to a hydraulic cylinder 84 for operating the brake 19 when desired.

Operation of general arrangement

The structure as so far described operates as follows:
Assume that the input shaft 10 is driven by the engine of an automobile whose propeller shaft is the final drive shaft 16, that the torque establishing device 11 is engaged, and that the car is at rest.

For forward drive the torque establishing device 72 is set, the reverse torque-establishing device 38 being released. On starting, the inertia of the car holds the carriers 40 and 42 and turbine $T_3$ stationary. Oil from the pump I (rotated at suitable speed) exerts torque on $T_1$ to drive the rear input sun gear 35 forward. Since the rear carrier 42 is momentarily held stationary, the rear pinions 46 attempt to drive the rear reaction ring gear 58 backward. This is prevented by torque-establishing device 72 and the two one-way devices 70—68—66 and 65—64—62. Consequently, ring gear 58 acts as a reaction gear and the pinions 46, driven by sun gear 35, walk around inside the ring gear to rotate the carrier 42 and output shaft 16 forward slower than the sun gear, thus multiplying the torque supplied by the turbine $T_1$. This motion also positively drives the turbine $T_3$ forward, regardless of the hydraulic conditions in the torque converter. It will be observed that $T_1$ while exerting its positive drive, necessarily runs faster than output shaft 16 by an amount represented by the ratio of the rear planetary gear set.

In addition, oil flowing from $T_1$ to $T_2$ exerts torque on $T_2$, which through shaft 36 drives the front ring gear 37 forward, tending to rotate the front pinions 44 forward and, when ring 37 rotates fast enough, tending to rotate the front sun reaction gear backward. This is prevented by the rear one-way device 70—68—66, which has previously been locked by the rear reaction ring gear 58. Consequently, the front ring gear 37 adds the torque of $T_2$, multiplied by the ratio of the front planetary unit to the transmission output shaft 16 by walking the front pinions around the front reaction sun gear 60, driving carrier 40 forward at reduced speed equal to the ratio of the front planetary gear set.

On starting the car, and below some definite speed depending on the design of the blades of the torque converter, the third turbine $T_3$ does not exert any positive or forward torque derived from hydraulic action but, as previously stated, it is positively driven by the carriers. However, at some definite speed ratio of input shaft to output shaft, positive hydraulic torque is impressed on $T_3$ and its speed due to hydraulic action tends to exceed the speed of the carriers driven by the other turbines. At this point $T_3$ assists in driving the car by torque exerted on the main drive shaft 39–16.

As the speed of the car progressively increases from stand-still two things happen successively. First, the torque delivered to the output shaft by $T_1$ through the rear planetary unit drops to a vanishing point as $T_1$ reaches its terminal speed. When the speed of $T_1$ multiplied by the ratio of the rear planetary unit becomes less than the speed of $T_2$ multiplied by the ratio of the front planetary unit, the second turbine $T_2$ is driving the carriers faster than $T_1$ can drive them and the front free-wheeler 65—64—62 breaks away, the rear reaction ring gear 58 rotates forward and $T_1$ idles in the oil stream. $T_2$ is now driving the car, assisted by $T_3$. Second, upon further increase in the speed of the car, $T_2$ reaches its terminal speed and can no longer drive the carriers through the front planetary as fast as $T_3$ which is directly connected to them. At this point the rear free-wheeler 70—68—66 breaks away, the sun gear 60 turns forward, and $T_2$ idles in the stream of the oil.

For reverse drive, forward torque-establishing device 72 is released and reverse torque establishing device 38 is set to hold front ring gear 37 to act as a reaction gear. Incidentally, this holds $T_2$ stationary during all reverse drive. Now $T_1$ drives rear input sun gear 35 forward, which because the carrier 42 is initially held by the stationary car, drives the rear ring gear 58 backward, and through the front one-way device 65—64—62 tends to drive the front sun gear 60 backward. This is permitted in fact, for although the outer one-way device 70—68—66 tends to lock, its race 70 can turn backward, being unopposed by the released torque-establishing device 72. Consequently the front free-wheeler 62—64—65 acts as a drive device for the front sun gear 60, which rotating backward walks the front pinions 44 backward around the ring 37, now acting as a reaction gear, and the carrier 40 is rotated slowly backward, driving the car backward and carrying the turbine $T_3$ positively backward. In fact, it is possible, depending on blade design, for the turbine $T_3$ to have reverse torque impressed on it hydraulically, in which case it will assist in driving the car backward. The turbine $T_2$, being held stationary in reverse drive, can act as a guide wheel or reaction member, directing oil from $T_1$ to the front sides of the $T_3$ blades, causing them to tend to drive the carriers.

In order to provide different values of torque multiplication for different driving conditions I make the angles of the reaction blades 30 adjustable. The stator is mounterd on a suitable rotatable support 86, having any known one-way device represented by rachet members 88 secured to the support 86 and overlapping a stationary tube 90 so as to permit forward rotation but prevent backward rotation, as is known.

The rear planetary gear set 35—46—58 shown in FIG. 1 may have a gear ratio of approximately 2.55 so that when the ring gear 58 is held the sun gear 35, and of course the first tubine $T_1$ rotates 2.55 times the fast as the carrier 42 and the output shaft 16. The front planetary gear set 60—44—37 may have a ratio of about 1.6 so that when the sun gear 60 is held, the ring gear 37, and of course the second turbine $T_2$, rotate at 1.6 times the speed of the carrier 40 and the output shaft 16. The third turbine $T_3$ and the output shaft always rotate together. Thus at any speed the torque delivered to the output shaft 16 by any turbine equals the value of hydraulic torque on that turbine (taking into account its algebraic sign or rotative sense) multiplied by the mechanical advantage of its connection to the output shaft. Therefore, at stall, although the turbine $T_3$ may even exert negative torque on the output shaft, the entire torque converter has a high positive torque ratio because the negative torque is more than overcome by the high torque of the first turbine multiplied by the mechanical advantage of its gear connection to the output shaft. At stall the torque ratio of the torque converter over all may be, for example, 3.7 to 1. The torque ratio of the torque converter as a whole decreases as the car speed increases until the speed of $T_3$ approaches the speed of the impeller, when the torque ratio is substantially unity and coupling occurs.

Under ordinary conditions of driving, the blades 30 of the stator or reaction member R are placed at a relatively low angle with respect to the direction of the oil striking them, as is known.

While the torque converter operating as described provides a satisfactory torque ratio at starting and at low speeds under light loads, it is an object of my invention to increase the range of torque ratios throughout an intermediate speed range in order to provide greater ability of the car to accelerate. It is also an object to prevent creep of the car from standstill when the engine is idling. When the car is standing, and in the intermediate speed ranges, which may be considered to be between 15 and 40 m.p.h., the blades 30 of the reaction member R may be placed at a somewhat higher angle, with respect to the axis of the converter, which angle may be regarded as of medium or intermediate magnitude. This, as is known, changes the direction of the oil through an angle of medium magnitude and increases the performance, or range of torque ratios effected by the torque converter, through a medium range when the engine is running at driving speed. When the engine is idling, this angle may decrease flow through the converter and thus prevent creep.

It is desirable to provide still higher range of torque multiplication for some conditions of drive, for example for hill climbing and passing other cars at relatively high speed. In order to provide this third or high performance range, the stator blades are placed at high angle, higher than the medium angle, and this further increases the performance, or ability of the car to accelerate, as is known.

In order to move the blades 30 and hold them at the desired angle each blade is mounted on a crankshaft 92 which can be positioned in any suitable manner, preferably by the structure and control apparatus described below.

*Structural arrangement*

FIGS. 2, 2A and 2B illustrate one form of actual structure embodying the invention and including the elements and their method of operation disclosed schematically above.

The blade arrangements of the various elements of the torque converter have previously been proposed by me. The particular structure of the mounting and devices for controlling the blades of certain elements of the torque converter are new.

Referring first to FIG. 2, the engine shaft 10 is bolted to a flywheel 100 which is bolted to a torque converter casing including an outer shell 102 and a front cover 104. The impeller blades 20 are attached to an outer impeller shell 106 and to an inner shroud 108. The space between the shell and the shroud forms the path through the impeller for working liquid, as is known. At its center edge, the impeller shell 106 is riveted to a quarter-toroidal shell 110 which is formed at its outer edge into a friction member forming one member of friction torque-establishing device 11, the other member of which is formed in the shell 102. When the device 11 is engaged, by controls to be explained, the impeller is driven by the engine. The impeller member of the device 11 includes a cylindrical surface 112 and a frusto-conical surface 114 which mate respectively with a cylindrical surface 116 and a frusto-conical surface 118, both formed in the drum 102. The space 120 between the torque converter shell 102 and the shell 110 constitutes an expansible chamber motor, hydraulic cell, or servo by which the device 11 may be held disengaged, the device being engaged by pressure of oil in the converter when this servo 120 is vented, as will be explained.

The cylindrical surfaces 112 and 116 form a seal which effectively prevents leakage from the servo 120 when the latter is filled. The conical surfaces 114 and 118 form friction engaging elements. If it is necessary to allow oil to escape from the pocket between members 114 and 118 when they are being engaged, openings 122 may be provided or the surfaces may be grooved.

The converter shell 102 is welded to a hub 126, secured to or forming part of a tubular shaft 127 which drives any suitable oil pump 128 (herein called the front pump) enclosed in part of the stationary casing 130. The shaft 127 is surrounded by a seal 131 which prevents leakage of oil from the torque converter into the dry chamber 132 which encloses the torque converter and is in turn enclosed within the transmission casing 130. The hub 126 is drilled and is spaced from the stator supporting sleeve 86 to form a passage 134 by which oil may be supplied to the release servo 120, as will be explained. The shaft 127 may be supported in the casing by a radial bearing 135.

The first turbine $T_1$ includes an outer supporting shell 136 and an inner shroud 138 between which the blades 24 are fixed. The $T_1$ shell 136 is suitably splined to a $T_1$ flange 140 and secured thereto by a snap ring 142. The $T_1$ flange 140 is welded at its center to hub 144 splined to the innermost shaft 34 which drives the rear sun gear 35 shown in FIGS. 1 and 2A. The hub 144 supports the front end of the shaft 34 and is itself supported for rotation by a radial bearing 146 and a thrust bearing 148 both bearing against a cap 150 which is secured to the front cover 104, as by welding. The cap 150 is supported slidably in a bore 152 in the engine shaft 10 and completes the closed chamber of the torque converter formed by the rear seal 131, shell 102 and front cover 104. The front cover 104 carries on its inner face a number of radial vanes 154 which rotate the liquid in the space between the cover 104 and the first turbine flange 140 at the same speed that the liquid is rotating within the working space of the torque converter and thus creates outside of the first turbine flange 140 static centrifugal pressure which balances that within the torque converter. The hub 144 has openings 156 for supplying the torque converter from a passage 158 in the shaft 34, to which the system supplies oil under pressure.

The second turbine $T_2$ includes an outer shell 160 having grooves 161 which forms a labyrinth seal with the drum or shell 136 of the first turbine $T_1$. The blades 26 are supported between this outer shell 160 and an inner shroud 162 which is fixed to or forms part of a spider 164 which is riveted to a flange 166 or hub secured to the front end of the shaft 36, the other end of which is splined to a drum 168, FIG. 2A, preferably formed integral with the ring gear 37 of FIG. 1 and provided with external splines 170 by which the drum and ring gear are connected to cone 38 in FIG. 1. The cone 38 may be held fast to the casing when gripped between a stationary cone 174 and a non-rotatable but slidable cone 176 forming part of a piston 178 slidable in a cylinder 180 and adapted to be urged to the right as FIG. 2A is seen to engage the reverse torque-establishing device by oil under pressure admitted to the cylinder by control devices which will be described. The piston 178 and cone 176 are constantly urged apart to disengage the reverse torque-establishing device by a return spring 182. The cylinder may be formed as an annular groove in a reaction flange 184 suitably bolted to the stationary casing 130.

The third turbine $T_3$ includes an outer shell 190 and an inner shroud 192 between which the blades 28 are fixed. The outer shell 190 is riveted to a hub or flange 194 splined to the front end of the hollow main shaft 39 splined at its rear end to the carriers 40 and 42 of both planetary gear units and to the transmission output shaft or car propeller shaft 16.

Referring to FIGS. 1 and 3, the reaction member, guide wheel or stator R which is placed between the outlet of turbine $T_3$ and the inlet of impeller I includes a blade support generally designated by 200 and an inner shroud 202 between which the blades 30 are mounted on the spindles 92. The stator support 200 is rotatable about the axis of the transmission but only in the sense of rotation of the turbines as is known. The support 200 has an outer cylindrical wall 203 joined to an inner cylindrical wall 204 by an annular or radial wall 206 to form an open ended annular cylinder 208. The radial wall 206 is secured to a flange 212 integral with or attached to the stator support sleeve 86 which in turn is supported for rotation by bearing sleeves 214 at the front and bearing sleeve 216 at the rear. Sleeves 214 are supported by the shaft 36 and sleeve 216 is supported by the casing 130 through the reaction plate 184. The right end of the sleeve 86 is splined to a flange 220, to the outer circumference of which is splined the outer race 222 of any suitable free-wheeler having sprags or rollers 88 which correspond functionally to the ratchet blade 88 in FIG. 1 and run on an inner race 226 fixed to the reaction flange 184 and hence fixed to the casing 130. The free-wheeler 222—88—226 permits the stator assembly as a whole to rotate in the sense of rotation of the turbines and prevent its rotation in the opposite sense as is known. Preferably the sprags or rollers 88 are held axially in the assembly by the flange 220 at one end and a retainer or snap ring 228 at the other end. The flange 220 may be provided with openings 230 disposed about a circle and receiving the tabs 232 of a thrust bearing washer disposed between the flange 220 and the front ring gear drum 168. Likewise the inner race 226 is formed with a series of openings 234 which receive tabs 236 of a similar thrust bearing washer between the flange 220 and the inner race 226. The flange 220 has oil holes 238 for lubricating the freewheeler.

As shown best in FIGS. 3, 4 and 5, each crank pin 92 has a crank arm 240 which is positioned in an annular groove 242 in an annular piston 244 which slides in the cylinder 208 and divides the cylinder into two fluid pressure chambers 208a and 208b. The position of the piston determines the angular position of the blades 30. The chamber 208a is open to the torque converter on the left of the piston as FIG. 2 is seen so that the pressure of the oil in the torque converter always urges the piston toward the right. When the piston is as far as it will go to the right, which position is shown in FIG. 3, the blades 30 are held at their highest angle or position of highest performance which is the position in which they redirect oil from the turbine $T_3$ to the impeller I through a relatively large angle. When the piston is in the position shown in FIG. 5 the blades are at their lowest angle, in which position they redirect oil through the lowest angle which gives the lowest range of torque multiplication in the converter.

As shown in FIGS. 2, 3–5, and as known in the art, the reaction blades 30 have a greater area on the downstream side of their pivots 92 than on the upstream side. This causes the blades to be urged toward low angle, urging the piston toward the position of FIG. 5, by the resultant hydrodynamic force on the blades of oil flowing from the third turbine $T_3$ to the impeller. If no pressure is maintained in the low angle holding chamber 208b, converter pressure in the high angle holding chamber 208a overcomes this hydrodynamic force and holds the piston in the position of FIG. 3 and holds the blades at highest angle. Oil under pressure can be supplied to the low-angle holding chamber 208b at the right of piston 244 through a passage 246 under the control of a position responsive valve or regulator valve 248, and oil can also be supplied to the chamber 208b through a midposition port 250 from a passage 252. Whenever oil is supplied through both passages at sufficient pressure, the piston is held in the position shown in FIG. 5 so that the blades are at lowest angle.

When oil is supplied to the low-angle holding chamber 208b through the passage 246 alone and passage 252 is vented the piston is held in the position of FIG. 4 holding the blades in a medium angle. This is accomplished as follows: When oil is first supplied to passage 246 at sufficient pressure, the piston 244 begins to move to the left. The sliding plug 248 follows the piston because the pressure on its right end is greater than the pressure on its left end. This is because pressure on its left end is that of oil flowing from its right end through a restricted passage 249 into an expanding space. When the piston reaches mid position the corner or edge 256 of the position-responsive valve cuts off communication between passages 246 and 249, stopping further admission of oil to the low-angle holding chamber 208b. This holds the intermediate piston in the position shown in FIG. 4. The valve 248 thus acts as both a position-responsive cut-off valve and as a pressure regulator valve which together with piston 244 maintains in the low-angle chamber 208b a pressure which with any hydrodynamic force on the blades balances the pressure in the torque converter. Thus if the pressure of the torque converter rises or that of the conduit 246 falls, the piston tends to move to the right but this opens the passage 249 to admit more liquid from the passage 246 which moves the piston to the left again until the passage 249 is closed. On the other hand if the torque converter pressure falls or the line pressure rises and piston 244 moves too far to the left, the corner or edge 258 of the piston uncovers the port 250 so that liquid is drained from the cylinder allowing the converter pressure to move the piston back to the right. As soon as the port 250 is closed by the corner 258 of the piston, further drainage is prevented and the piston is held in the mid-position.

Passage 246 includes the annular space between stator shaft 86 and the $T_2$ shaft 36 and communicates with the control system as will be explained. The passage 252 includes the space between the $T_2$ shaft 36 and the $T_3$ shaft 39 and this passage is prevented from communicating with the passage 246 by the rearmost of the bearing sleeves 214 which effectively forms a seal between them. The passage 252 communicates with the control system as will be explained. The piston 244 is held in the cylinder 208 by a retainer or snap ring 260 which may have openings to receive tabs 262 of a radial thrust washer between the end of the inner wall 204 of the stator support and the hub 166 of the $T_2$ shaft 36. The front bearing sleeve 214 forms a seal, sufficiently preventing communication between passage 252 and the interior of the converter.

It will be understood that such seal need not be pressure-tight, and in fact a bearing usually is not. Considerable leakage may occur past a bearing sleeve, and yet the bearing may effectively seal or stop the end of a passage, for example, because leakage is constantly made up by the excess capacity of pumps 128 and 80, as is known. It is sufficient, where large quantities of liquid are constantly available from the pumps, that such a bearing prevent a passage from leaking as fast as it can be supplied, or that the bearing maintain a desired difference of pressure between two spaces, as the case may be.

Oil is supplied under pressure to the conduit 153 and the converter is kept under pressure by the pumps including the front pump 128 forming part of the control system as is known. Oil may leave the working space of the torque converter by the pressure responsive relief valve 274 of any suitable form, located in $T_3$ hub 194 and allowing oil to pass from the torque converter space between the $T_2$ hub 166 and the $T_3$ hub 194 to the passage 276 formed by the annular space between the shaft 34 and the shaft 39 at a point behind bearing sleeve 278, this passage 276 being sealed from communication with other parts of the torque converter at its front end by the seals 280.

The rear end of shaft 34 which connects the first turbine $T_1$ to the rear input sun gear 35 is supported for rotation in a radial bearing 290, FIG. 2A, in a bore in the front end of transmission output shaft 16 which in turn is supported in the casing 130 by a rear anti-friction bearing 292, FIG. 2B, and by a front radial sleeve 294 supported in a cylinder 296 which is secured to the casing 130. The hollow shaft 39 which is driven by the third turbine $T_3$ forms part of the direct drive mechanism from $T_3$ to the final drive shaft 16. FIG. 1 shows this shaft schematically as connected to the rear carrier 42 and to the transmission output shaft 16. As seen in the structural view FIG. 2A, this carrier 42 and the connection to the output shaft are formed by a flange 300 splined to the shaft 39, the planetary spindles 302 supported in the flange 300 and in a rear flange 304 which is splined to the output shaft 16. Carrier 40 of the front planetary unit in FIG. 1 is formed as shown in FIG. 2A by a front flange 306 splined to the flange 300, and by the planetary spindles 308 and the rear flange 310.

The rear carrier spindles 302 support the planetary pinions 46 of FIG. 1 which mesh with the rear input sun gear 35 and with the rear reaction ring gear 58. The ring gear 58 is formed on a drum 61 splined to a flange 312 formed integral with a tubular shaft 314 which is supported for rotation by bearing sleeves 316 on the output shaft 16. The flange 312 is riveted to the outer race 62 which is the member 62 in FIG. 1 and forms the outer race of the front free wheeler 62—64—65 of FIG. 1. This free wheeler has any suitable sprags or rollers 64 (corresponding to the diagrammatic ratchet blade 64 in FIG. 1) bearing upon the inner race 65 which is a cylinder formed integral with a flange 320 which is riveted to a race 66 corresponding to the race 66 in FIG. 1 and forming the outer race of the rear free wheeler 66—68—70.

The rear free wheeler has sprags or rollers 68 which bear against the inner race 70 corresponding to the race 70 in FIG. 1. The flange 320 is splined to the drum 76 which is in turn splined to the front sun gear 60. The race 70 is splined to the flange 78 which carries the cone 72 of the forward torque-establishing device which corresponds to the torque-establishing device 72 in FIG. 1. The races 65 and 70 are supported by a bearing sleeve 328 suitably pierced to provide oil passages. This arrangement of sleeves 316 and 328 makes a very convenient and effective support for centering accurately all of the races of both free wheelers as well as the clutch cone 72. The races are accurately held in axial alignment by a radial thrust washer 330 between the flange 312 and the flange formed integral with the front end of the output shaft 16, and the radial thrust washer 332 held by snap ring 334.

The drum 72 can be held fast by being pressed between a stationary cone 340 and a non-rotatable slidable inner cone 342 carried on or forming part of a piston 344, keyed to the cylinder 296 to prevent rotation and slidable within a hydraulic chamber 346 formed within the cylinder. The piston has a web 348 dividing the chamber or space within the cylinder into two pressure chambers, one being the chamber 346 just mentioned, and the other a second chamber 350. The piston is normally held to the left as FIG. 2A is seen to hold the cones 340, 72 and 342 in engagement by a plurality of springs 352 disposed at suitable intervals around the cylinder 296. The springs assure that the forward torque-establishing device is always lightly engaged except in reverse so that any slip in the power train during engagement of a friction member will occur in the neutral torque-establishing device 11 rather than the forward torque-establishing device 72. However, the springs 352 are too light to hold the cones together with enough force to sustain the torque reaction required to drive the car. Consequently, when the control is placed in drive position oil under pressure is admitted to the cylinder 346 by control apparatus, which will be described, to hold the cones together with sufficient force to sustain the torque reaction. Whenever it is desired to release the forward drive torque-establishing device which need only be done when the control is placed in reverse the cylinder 346 is vented and oil under pressure is admitted to the space 350 to hold the piston 344 to the right against the force of the springs and release the cones 340, 72 and 342. When the torque-establishing device 72 is set by the piston 344 the race 70 is positively held against rotation as in FIG. 1. This prevents the races 66 and 65 from turning backward and this in turn prevents the reaction ring gear 58 and the reaction sun gear 60 from turning backward. Also, as in FIG. 1 when the torque-establishing device 72 is released, it permits the ring gear 58 to drive the sun gear 60 backward when the transmission is set for reverse.

The rear pump 80 may include an external gear 360 splined to the output shaft 16 and meshing with an internal gear of known form 362 to provide oil under pressure in response to forward rotation of the output shaft as is known and as will be further explained in connection with the control system.

A gear 364 of generally known form and constituting a part of a parking lock or parking brake is splined to the output shaft 16 and held axially in place by a pair of snap rings 366. The gear may be engaged to lock the car against motion by any suitable known form of parking lock, not shown.

The hill brake 19 and its operating mechanism 84 diagrammatically indicated in FIG. 1 are shown structurally in FIG. 2B. The brake proper includes stationary disks or plates 400 of any suitable form splined to the casing on bolts or studs 402 and interleaved between driven plates or disks 404 splined to a slidable hollow shaft 406 carrying a clamp 408 held against movement to the right with respect to the shaft 406 as FIG. 2B is seen by a stop or snap ring 410 by which the plates may be clamped together against a stationary abutment 412. The member 414 is a flange which helps retain coolant around the brake disks and supports a radial bearing sleeve 416 which supports one end of the hollow sleeve 406, the front of which is supported for rotation by a similar bearing sleeve 418 on the output shaft 16. Whenever the sleeve 406 is moved to the left as FIG. 2B is seen, the clamp 10 engages the stack of plates to retard rotation of the sleeve 406.

In order to connect sleeve 406 to the output shaft for rotation and to move it to the left to clamp the brake plates together I provide the following mechanism. A cone 420 is slidably supported on a plurality of pins 421 in the parking gear 364 so that the cone 420 always turns with the output shaft 16 and is axially slidable with respect to it. Inside the cone 420 is a second cone 422 splined to the hollow shaft 406 and held against movement to the left with respect to the shaft 406 as FIG. 2B is seen by a stop or snap ring 423. Outside of the cone 420 is a third cone 425 forming part of a disk or web 426 which is journaled on and slidable with respect to the hollow shaft 406. Axially adjacent the disk 426 is a second disk 428 which is splined on the hollow shaft 406 and held against movement to the right with respect to the shaft 406 by a stop or snap ring 430. A cylinder 432 is fixed to the casing and has a hollow pressure chamber 434 formed on its inside to receive a piston 436 slidable in the cylinder and sealed to hold pressure within the space 434 by any suitable seals 438. The piston slides on the hollow shaft 406 and is sealed with respect to the hollow shaft by a seal 440. The piston is urged to the right as FIG. 2B is seen by a wavy circular spring 442 held by a snap ring 444. The piston may be moved to the left by hydraulic pressure in the cylinder 434 and when so moved moves the cone 425 to the left through a thrust bearing 446.

When the cone 425, moving to the left under the influence of pressure in the cylinder 434, engages the cone 420 it pushes the cone 420 against the cone 422 which then immediately starts to rotate the hollow shaft 406 if the car is moving. In order to insure firm engagement of the clutch cones 420, 422 and 425 before the brake plates 400 and 404 are engaged and thus insure that any slip will be taken in the plates rather than the cones, the cone 425 is equipped with any suitable self-energizing device represented by the balls 448 placed between opposing conical depressions in the plates or disks 426 and 428. As soon as the cones 416, 420 and 424 start to engage, the disk 426 is rotated with respect to the disk 428 which is temporarily held from rotation by the inertia of the parts including the hollow shaft 406 and all parts keyed to the shaft 406. This relative rotation between the plate 426 and plate 428 urges the cones firmly into contact as is known. Pressure in the cylinder 434 continues to urge the piston to the left and this through the cones 424, 416 and 420 and stop 423 pushes the shaft 406 to the left with a force proportional to the pressure in the cylinder. This causes the clamp 410 to press all of the plates together against the stop 408 and this retards rotation of the output shaft.

A cooling pump 450 of any suitable form is splined to the brake shaft 406 so that it rotates whenever the brake shaft rotates to supply cooling oil to the brake plates 400, 404. The web 414, bearing 416, hollow shaft 406, seal 440, piston 436, seal 438 and cylinder 432 enclose a space 452 within the casing 130 which is adapted to be kept filled with oil and to have oil circulated through it by the pump 450 whenever the brake is applied. The intake of the pump may be from any suitable part in the hydraulic system such as the usual sump, not shown, the outlet of the pump may be at any suitable place, and the outlet of the space 452 is at any suitable height to assure immersion of the plates and/or flow of cooling and lubricating oil over the plates whenever the brake is applied.

Control system

The structure described above can be operated by any suitable controls which select forward and reverse and which place the stator blades in the desired positions either manually or automatically, but preferably I use controls including improved and novel features as described below and shown diagrammatically in FIGURES 6 and 6A.

In general the objects of the invention as embodied in the control system are to provide two sources of control pressure, one operative whenever the engine is running, and one operative whenever the car is running forward; a manually operable selector for selecting forward, neutral and reverse and conditioning the control to permit braking while moving forward; means for preventing brake operation unless the throttle is closed, and when the car is moving backward; a brake apply and release device which releases the brake whenever the car speed drops below a predetermined point after application of the brake; an automatic control for increasing the angle of the stator blades both in response to a predetermined torque demand on the engine and whenever the car stops; and a manually operated control for placing the stator in high angle in response to high torque demand on the engine but only after the throttle has been fully opened.

The source of pressure operative whenever the engine is running is the front pump 128 shown in FIGS. 2 and 6A. This may be of the internal-external gear type and is designed to provide at its outlet a constant pressure, which pressure however may be adjusted or modulated with changes of torque demand on the engine by suitable controls to be described. The source of pressure operative when the car is running forward is the rear pump 80 as shown in FIGS. 2B and 6, which may be similar in construction and operation to the front pump, but provides constant pressure above a certain car speed. However, the flow from the rear pump is divided into two paths. One of these is combined with the flow from the front pump, or is substituted for it, and so its pressure is regulated by torque demand. The other part of the flow controls the mid position of the stator and the application of the hill brake, and the pressure of this branch of the flow is not modulated.

Referring to FIGS. 6 and 6A, both pumps take in oil from a common sump 500 and their outlets 502 and 504 discharge to a common outlet 506 which leads to the main hydraulic control line 508 through a regulated pressure chamber 510 in the pressure regulator valve.

The front pump outlet 502 is connected to the common outlet 506 through a check valve 512 and the rear pump outlet 504 is connected to the common outlet 506 through a check valve 514 so that when one pump is not operating, the other pump can supply oil to the system and this supply will not be drained through the idle pump.

The pressure regulator valve includes a valve stem 516 constantly urged to the left by a spring 518 against the force of pressure in a regulating chamber 520 which is connected to the common pump outlet 506 by a duct 522. The pressure in the regulating chamber 520 urges the valve stem to the right with a force which is proportional to the pressure in the main line 508. The front pump outlet 502 is also connected to the pump selector chamber 526 of the regulator valve by a connection 528 independent of the check valves.

When the pressure of oil flowing from both pumps 128 and 80 reaches a predetermined value which occurs when the car speed has reached a predetermined value, the stem 516 has moved to the right far enough to permit land 530 to connect the pump selector chamber 526 with a venting chamber 532 which is connected to the sump. When this occurs, the front pump is vented to the sump through the line 534 which reduces the pressure maintained by the front pump, thus reducing load on the engine and permitting the rear pump to supply the requirements of the system through the check valve 514, the check valve 512 then being closed. Thereafter, the pressure regulator valve tends to maintain a constant pressure in the line 508. If the pressure tends to increase above a predetermined maximum, the stem 516 moves to the right far enough to permit the land 536 to vent the regulated pressure chamber 510 through the pump selector chamber 526 (which has previously been opened to venting chamber 532 by the land 530) and chamber 532.

This pressure maintained in the main line 508 may nevertheless be reduced in response to low torque demand on the engine by an suitable torque demand responsive regulator valve, for example that shown in said application S.N. 537,472 and represented by the vacuum modulator valve generally denoted by 540. Whenever torque demand on the engine is low, the absolute pressure in the manifold is low (vacuum is high) and this reduces pressure in the main line 508. Thus main line pressure is maintained as a function of torque demand in the manner and for purposes which are known.

Oil is supplied to the converter from the main line 508 through conduit 158 previously referred to which includes the bore 158 of the hollow shaft 34 in FIG. 1. Oil is supplied to the converter through a restriction 559 and oil is led from the converter to lubricate the various parts of the apparatus by the conduit 276 under the control of the pressure responsive release valve 274. This arrangement maintains a static pressure in the torque converter which is below that of the main line and may be for example 30 pounds per square inch.

A manual selector valve 560 is supplied with oil from the main line 508 at its inlet port 562. The valve is shown in the forward drive position in which oil is supplied to the forward torque-establishing device apply cylinder 346 and oil is supplied to a medium to high performance stator control valve generally denoted by 564 through the line 566. At the same time, the neutral clutch release servo 120 is vented through the open end 568 of the manual valve. This permits the pressure of oil in the converter to apply the neutral clutch and sustains the necessary torque reaction in the forward drive torque-establishing device to drive the car.

The medium to high performance stator control valve 564 is shown in position of slightly open throttle in which the car may be driven. The valve 564 includes a valve stem 570 which may be urged to the right against a return spring 572 by an arm 574 connected to the throttle mechanism of the engine so that the position of the valve stem 570 to the right of its zero position indicates the amount of throttle opening. The valve includes a chamber 576 communicating with the inlet 566 and supplying oil from mainline to the passage 246, previously described, in all positions of the throttle from idling to full throttle, to hold the stator blades either in mid-position or in low-angle depending upon whether the mid-position control port 250 is supplied with oil as will be explained. Whenever the throttle is moved past wide-open position, a land 578 is positioned between the connection of conduit 246 and the connection of conduit 566 so that conduit 246 and stator low-angle holding chamber 208b are vented through the open end of the stator control valve around stem 570. This empties the chamber 208b and allows the pressure in the converter 12 to hold the stator blades 30 in highest angle, which is the position shown in FIG. 3.

The control for holding the stator blades in mid-position is shown in the upper right corner of FIG. 6A. The mid-position control port 250 and conduit 252 previously described in connection with FIG. 3 are arranged to be connected either to the rear pump by conduit 580 or to an exhaust port 582 by a low to medium performance control valve generally designated by 584. This valve includes a valve stem 586 urged to the left as FIG. 6A is seen by a spring 588 and movable to the right against the spring by the modulated line pressure as an indicator of torque demand, and derived from chamber 542 of the vacuum modulator valve, which is connected to a stator control valve operating chamber or servo 590 by conduit 592.

Whenever the pressure in the engine manifold is low, indicating low torque demand, which may be for example, indicated by a numerical gauge reading higher than 6 to 8 inches of mercury vacuum in the manifold, the spring 588 holds the valve 584 in the position shown in FIG. 6A so that oil at the pressure of the rear pump is supplied by conduit 580 to conduit 252 while exhaust port 582 is closed. If the car is running forward above a predetermined speed, this brings about the condition shown in FIG. 5 in which the mid-position control port 250 is supplied with oil at rear pump pressure, and this holds the stator blades 30 in position of lowest angle as previously described. Whenever the torque demand rises above a value indicated by a gage reading of 6 to 8 inches of mercury vacuum in the engine manifold, the pressure of oil in chamber 542 of the vacuum modulator valve 540, acting in chamber 590 of the valve 584 pushes the valve stem 586 to the right to cut off conduit 580 and connect port 250 to exhaust port 582. This establishes the condition shown in FIG. 4 in which port 250 is vented but the low-angle holding chamber 208b is supplied with oil at a regulated pressure from conduit 246 so that the pressure of oil in the converter is balanced by that in chamber 208b and holds the stator piston 244 in the mid-position shown in FIG. 4 as previously described. The land 594 is of larger diameter than the land 596 so that when oil is admitted to the line 252 from the line 580 the excess of area in land 594 adds to the force of the spring 588 to provide hysteresis to cause valve 584 to open and close at different values of the torque demand, as is known.

The unregulated pressure of the rear pump is also used to actuate the hill brake under the control both of the manual valve 560 and a hill brake relay control valve 594 which is integral with the stator control valve 564. The hill brake apply servo 434 is activated by the pressure of oil in conduit 600 whenever the automatic pressure-responsive hill brake apply valve 82, shown in FIGS. 1, 8, and 9 is open. In order for the line 600 to be supplied with oil, it is necessary both that the engine throttle be closed and that the manual shift valve 560 be in the braking position marked B in FIG. 6. When the throttle is closed, the line 600 can communicate with the manual valve by way of line 602 through the space between the lands 604 and 606 of the hill brake relay valve 594 but when the throttle is open slightly the land 604 closes the line 602 and connects line 600 to an exhaust port 608. The line 602 can in turn be connected with the rear pump line 580, whenever the selector valve 560 is in braking position, through the space between the lands 610 and 612. However, in any other position of the manual valve 560, the line 602 is connected to exhaust through the open end 614 of the manual valve so that in any position of the manual valve except braking it is impossible to supply the line 600 with control oil.

Whenever the manual valve 560 is in B position and the throttle is closed, and the rear pump is operating, which occurs when the car is moving forward, the line 600 is filled with oil. The pressure of this oil is sufficient to apply the hill brake only when the car is moving above a predetermined minimum speed for example 10 miles per hour. When this occurs the pressure in the line 600 opens hill brake apply valve 82 by moving its stem 620 to the right as FIG. 6A is seen against a return spring 621 to close exhaust port 622 and open supply port 623 to connect line 600 to the hill brake apply servo 434 through port 624. Whenever the pressure of the rear pump is below a predetermined amount which indicates a low car speed, the spring 621 moves the valve stem 620 to the left against a stop 625 to close port 624 and thereby cut off line 600 and vent the hill brake apply servo 434 to exhaust port 622. This arrangement prevents the application of the brake at low speeds even when the stator control valve is in zero throttle position and the manual valve is in braking position, and it also removes the brake after it has been applied whenever the speed of the car drops below a predetermined value.

The hill brake apply valve 82 may be formed in the cylinder 432 as shown in FIGS. 7, 8, and 9. A bore 626 in the body of cylinder 432 receives the valve stem 620 and spring 621 both of which may be held between the stop pin 625 referred to and a spring stop pin 629. Part of the passage 600 and the ports 622, 623 and 624 are formed by suitable smaller bores in the cylinder body, the cylinder passage or port 624 being shown in FIG. 8 as leading into the space 434 which with piston 436 forms the servo for operating the hill brake. Land 627 may be larger than 628 to provide hysteresis.

It is desirable to have the hill brake disks or plates constantly coated with oil or immersed in oil so that they are lubricated at the instant the hill brake cooling pump starts to operate. To this end the overflow from the regulator valve, that is from the overflow chamber 532, is connected to the hill brake space 452 by a conduit 630 which discharges into the space 452 through a restricted connection 632. The connection is restricted to divert most of the oil overflowing from the pressure regulator valve through a cooler 634 from which the oil flows to the sump 500 by the line 636. A cooler pressure regulator valve 640 requires all of the oil discharged from the pressure regulator valve and not flowing through the restricted conduit 632 to the hill brake cooling chamber to pass through the cooler. The cooler pressure regulator valve 640 includes a valve proper 642, urged against a seat 644 by a light spring 646 to close the overflow conduit 534. If the cooler should become clogged or if oil should not flow freely through it for any reason such as high viscosity due to low temperature the pressure of the oil in the chamber 532 overcomes the spring 646 and opens the valve 642 to bypass the cooler. The valve proper 642 is preferably formed as a cylinder having a large bore through which the oil can freely flow from conduit 534. The spring 646 is placed in this bore and does not offer any obstruction to the flow of oil. Whenever the valve 642 is moved downward, the inlet adjacent the seat 644 is fully open to the large bore in the center of the valve and this permits unrestricted flow to the sump 500.

In order to increase the pressure at which the cooler is bypassed during the periods when the hill brake is applied and cooling is consequently urgent, the value of the pressure necessary to open the valve 640 is increased whenever the hill brake is applied. This is accomplished by a pressure chamber or servo 648 which, when energized, assists the spring 646 to hold the valve 642 seated. The servo 648 is connected by a line 650 to the hill brake apply line 600 so that whenever the line 600 is activated to apply the brake the force holding the valve 642 closed is increased.

Whenever the brake cooling pump 450 is operating, it draws oil from the sump 500 and discharges through a conduit 652 to a port 653 in the hill brake chamber 452 and located below the level of the outlet of this chamber, which outlet is constituted by the connection of conduit 630 by which oil discharged from the brake chamber goes to the cooler 634 and/or sump. In order to provide unrestricted flow from the brake cooling chamber the restricted passage 632 is by-passed through a check valve 654.

Whenever the manual valve 560 is in either park position, indicated by P in FIG. 6, or is in neutral position, designated N, the open end 568 of the shift valve is closed by land 656, to supply the release chamber 120 of neutral clutch 11 with oil from main line port 562 to hold the neutral clutch disengaged. In all other positions of the manual valve 560 the land 656 is at the right of the connection to chamber 120 to vent it through the open end 568, to permit converter pressure to engage the neutral clutch 11. That is, this occurs in D, drive; B, braking; and R, reverse.

In the drive and brake positions, the land 656 is between the connections to neutral torque-establishing device release chamber 120 and forward drive clutch servo 346 so that the forward drive torque-establishing device 72 (FIG. 1) is engaged. This engagement of torque-establishing devices 72 and 11 lets the car be driven forward, either with or without braking. Also in the drive position the land 612 is at the left of the connection of hill brake control conduit 602 so that the hill brake cannot be applied. When the manual valve is in the reverse position the land 612 has moved out of the open end 614 of the shift valve so that the hill brake apply line 602 is vented through the space between the lands 610 and 612 and into the open exhaust port 614. Thus whenever the manual valve is in "B" position the car can be driven normally forward and whenever the throttle is closed and the car is moving above a minimum speed of about 10 miles per hour the hill brake is applied. Whenever the manual valve is placed in reverse or "R" position the land 658 moves to the right of the connection 660 to the reverse torque establishing device servo 180 and forward torque establishing device release servo 350, and land 656 takes the position between the mainline port 562 and the connection to the drive torque-establishing device servo 346. This vents the forward drive torque-establishing device servo 346 through the open end 568 and supplies oil to the reverse torque-establishing device servo 180 and to the forward frited release servo 350.

The control system operates as follows. Assume the car is standing still with the engine running and the throttle closed or in the idling position. If the manual valve is in either park or neutral position, the neutral torque-establishing device release servo 120 is supplied with oil and consequently disengages the neutral clutch 11. Also the forward drive torque-establishing device servo 346 is energized setting the forward drive torque-establishing device 72. This arrangement assures that when the control is later put into drive, braking or reverse positions, the forward or reverse drive torque-establishing device, as the case may be, will always be set before the neutral torque-establishing device is engaged. Likewise, the stator control valve 564 admits oil to the low-angle holding chamber 208b through the line 246. On starting, and in reverse the torque requirement may be considered to be high, regardless of engine manifold pressure. Although on starting forward or in any conditions of reverse at low throttle the stator mid position vent valve 584 is in position to supply port 250, which would otherwise hold the stator in low position, now there is no pressure in line 252 because the rear pump is not delivering oil. Consequently, this places the stator in mid position, which it always takes on starting and in reverse. This also restricts flow through the converter at engine idling speeds, which tends to prevent creep.

Let us assume that the car is now started by placing the manual control in either "D" or "B" position. The only difference between these two positions is that when the manual control is in "B" position that the hill brake can be applied and when the manual valve is in the "D" position it is impossible to apply the hill brake. With the car in "D" position the neutral clutch release chamber 120 is vented and the neutral clutch is applied, thus conditioning the car for drive. Thereafter opening of the throttle starts the car in the usual manner with the stator in the mid-range position to give medium performance which is of advantage on starting. The stator will remain in mid-position until the car reaches a predetermined speed, at which time the pressure of the rear pump will be supplied to port 250 through the open mid-range stator control valve 584 if the throttle is not advanced. This will move the stator piston to the position of lowest angle shown in FIG. 5.

If the car is started with the throttle at advanced opening indicating a medium or high torque demand or if at any time after starting the throttle is opened far enough to cause the pressure in chamber 542 of the vacuum modulator valve to close the mid-range stator control valve 584 then the line 252 will be vented and the stator will remain in mid-position until the torque demand falls enough to reduce the pressure in chamber 542 of the vacuum modulator valve sufficiently to allow mid-range stator control valve 584 to close.

In reverse drive the stator will continue in mid-position regardless of speed or torque demand because the rear pump, running backwards, produces no pressure, and the line 252 cannot be filled.

In any of the drive positions, "D," "B" or "R," whenever the throttle is moved past wide-open throttle position by the arm 574 operated by the usual throttle pedal, indicating very high torque demand, then the low-angle holding chamber 208b is vented through line 246 and the stator moves to the highest angle position as shown in FIG. 3.

Assuming that the car is started gently, that is at low throttle opening. After the car reaches some definite speed, the rear pump pressure in line 580 will move the stator blades 30 from medium angle to low angle. As is known, when car speed attains a predetermined relationship to engine speed, the condition known as hydrodynamic coupling occurs in which oil leaves $T_3$ in such a direction as to strike the back or convex sides of the blades 30 and so rotates the whole reaction device forward. If thereafter the blades are placed in medium angle with the car at low and medium speeds, the stator again becomes stationary and the converter goes from coupling stage back to converter stage. Converter stage continues until the car speed increases to the point where coupling can occur with the blades at medium angle. It is even possible to design the transmission so that coupling does not occur within car speeds practically attainable, when the blades are at medium angle. However if coupling occurs at medium angle, and if thereafter the throttle pedal is floored, the blades are placed in high angle and the stator again locks against backward rotation and the device again reverts to the converter stage.

What is claimed is:

1. A transmission comprising in combination, a pair of torque-establishing devices adapted to establish a driving connection between an input member and an output member when both devices are engaged and to break the driving connection when either device is disengaged, yielding means urging both devices to engage, means for selectively permitting and preventing engagement of one device, and means for assisting the engagement of the other device whenever said one device is permitted to engage.

2. A transmission comprising in combination, an input member adapted to drive an output member through a gear train, a pair of torque-establishing devices adapted to establish driving connection through the gear train when both devices are engaged, means for engaging and disengaging one device, yielding means constantly urging the other device to engage, means for selectively establishing different drive conditions in the gear train, means for assisting engagement of the other device whenever both said one device is engaged and one drive condition of the gear train is established, and means for preventing engagement of the other device whenever another drive condition is established in the gear train.

3. A transmission comprising in combination, an input member adapted to drive an output member through a gear train, a pair of torque-establishing devices adapted to establish driving connection through the gear train when both devices are engaged, means for engaging and disengaging one device, yielding means constantly urging the other device to engage, means for selectively establishing forward and reverse drive in the gear train, means for assisting engagement of the other device whenever both said one device is engaged and forward drive in the gear train is established, and means for preventing engagement of the other device whenever both said one device is engaged and reverse drive is established.

4. A transmission comprising in combination, an input member adapted to drive an output member through a gear train, means for establishing forward and reverse drive through the gear train, said last-mentioned means including a first torque-establishing device, a second torque-establishing device and a third torque-establishing device, the first and second devices being adapted to establish forward drive when both devices are engaged and to interrupt the drive when either the first or second device is disengaged, the first and third devices being adapted to establish reverse drive when both devices are engaged and to interrupt drive when either the first device or the third device is disengaged, means for engaging and disengaging the first device, means constantly urging the second device to engage, means for engaging and disengaging the third device, means for assisting engagement of the second device whenever the first device alone is engaged, and means for preventing engagement of the second device whenever the first and third devices are engaged together.

5. A transmission comprising in combination, an input member adapted to drive an output member through a gear train, means for establishing forward and reverse drive through the gear train, said last-mentioned means including a first torque-establishing device, a second torque-establishing device and a third torque-establishing device, the first and second devices being adapted to establish forward drive when both devices are engaged and to interrupt the drive when either the first or second device is disengaged, the first and third devices being adapted to establish reverse drive when both devices are engaged and to interrupt drive when either the first device or the third device is disengaged, means urging the first and second devices to engage, means for selectively permitting or preventing engagement of the first device, means for engaging and disengaging the third device, means for assisting engagement of the second device whenever both engagement of the first device is permitted and the third device is disengaged, and means for preventing engagement of the second device whenever the third device is engaged.

6. A transmission comprising in combination an input member, an output member, a pair of torque-establishing devices adapted to establish a driving connection between the members when both devices are engaged, means constantly urging one device to engage, a source of fluid under pressure, a fluid pressure chamber for assisting the urging means, fluid pressure means for engaging the other device, fluid pressure means for preventing operation of the engaging means, means for selectively venting the preventing means or connecting the preventing means to the source, and for connecting the fluid pressure assisting chamber to the source whenever the preventing means is vented.

7. A transmission comprising in combination an input member which can transmit torque to a hydrodynamic torque-transmitting device which can transmit torque to an output member, a source of pressure fluid, means for maintaining the torque-transmitting device filled with fluid under pressure, a first torque-establishing device adapted when moved in one direction to establish a driving connection through the hydrodynamic torque-transmitting device and adapted when moved in the opposite direction to interrupt such connection, means responsive to the pressure in the hydrodynamic torque-transmitting device for urging the torque-establishing device in one direction, a first fluid pressure chamber for urging the torque-establishing device in the opposite direction, means for selectively admitting fluid pressure in the chamber to disengage the first torque-establishing device and venting the chamber to engage the torque-establishing device, a second torque-establishing device, the two torque-establishing devices establishing a driving connection between the input and output members when both are engaged, and breaking the driving connection when either is disengaged, means constantly urging the second torque-establishing device to engage, a second fluid pressure chamber for assisting the last-mentioned urging means, and means responsive to selecting absence of pressure in the first fluid pressure chamber in engaging the first torque-establishing device for connecting the second chamber to the source, 8. A transmission comprising in combination an input member which can transmit torque to a hydrodynamic torque-transmitting device which can transmit torque to an output member, a source of pressure fluid, means for maintaining the torque-transmitting device filled with fluid under pressure, a first torque-establishing device, means responsive to the pressure in the hydrodynamic torque-transmitting device for urging the torque-establishing device to engage, a first fluid pressure chamber for urging the torque-establishing device to disengage, means for selectively admitting fluid pressure to the chamber to disengage the first torque-establishing device and venting the chamber to engage the torque-establishing device, a second torque-establishing device, the two torque-establishing devices establishing a driving connection between the input and output members when both are engaged, and breaking the driving connection when either is disengaged, means constantly urging the second torque-establishing device to engage, a fluid pressure chamber for assisting the urging means, and means for connecting the second chamber to the source whenever the first chamber is vented.

References Cited in the file of this patent
UNITED STATES PATENTS

| | | |
|---|---|---|
| 2,387,398 | Hruska et al. | Oct. 23, 1945 |
| 2,597,245 | Kelbel | May 20, 1952 |
| 2,627,723 | Seybold | Feb. 10, 1953 |
| 2,640,572 | O'Brien | June 2, 1953 |
| 2,645,135 | Frank | July 14, 1953 |
| 2,693,711 | Kelbel et al. | Nov. 9, 1954 |
| 2,747,431 | Roche | May 29, 1956 |
| 2,750,017 | Ahlen | June 12, 1956 |

UNITED STATES PATENT OFFICE
CERTIFICATE OF CORRECTION

Patent No. 3,019,670                                               February 6, 1962

Oliver K. Kelley

It is hereby certified that error appears in the above numbered patent requiring correction and that the said Letters Patent should read as corrected below.

Column 4, line 16, after "carriers" insert -- backward -- line 20, for "mounterd" read -- mounted --; line 21, for "rachet" read -- ratchet --; line 28, for "tubine" read -- turbine --; column 7, lines 58 and 59, for "intermediate piston in the" read -- piston in the intermediate --; column 12, line 11, for "an" read -- any --; column 15, line 30, for "frited" read -- torque-establishing device --.

Signed and sealed this 24th day of July 1962.

(SEAL)
Attest:

ERNEST W. SWIDER
Attesting Officer

DAVID L. LADD
Commissioner of Patents